United States Patent [19]

Grönlund et al.

[11] Patent Number: 5,483,565
[45] Date of Patent: Jan. 9, 1996

[54] FUEL ASSEMBLY FOR A BOILING WATER REACTOR

[75] Inventors: Magnus Grönlund, Västerås; Anders Söderlund, Surahammar; Anders Wallander, Västerås, all of Sweden

[73] Assignee: ABB Atom AB, Västerås, Sweden

[21] Appl. No.: 238,526

[22] Filed: May 5, 1994

[30] Foreign Application Priority Data

Jun. 3, 1993 [SE] Sweden .................................. 9301909

[51] Int. Cl.$^6$ ..................................... G21C 1/04
[52] U.S. Cl. ......................... 376/352; 376/353; 376/440; 376/444; 376/210; 376/374
[58] Field of Search ..................................... 376/353, 352, 376/440, 444, 210, 374; 976/DIG. 60

[56] References Cited

U.S. PATENT DOCUMENTS

| | | | |
|---|---|---|---|
| Re. 34,246 | 5/1993 | Crowther | 376/443 |
| 3,692,064 | 9/1972 | Hornerlein et al. | 138/42 |
| 3,697,376 | 10/1972 | Mefford et al. | 376/440 |
| 3,720,222 | 3/1973 | Andrews et al. | 137/154 |
| 3,864,209 | 2/1975 | Tong | 376/352 |
| 3,892,625 | 7/1975 | Patterson | 376/176 |
| 4,035,233 | 7/1977 | Williamson et al. | 376/440 |
| 4,695,426 | 9/1987 | Nylund | 376/441 |
| 4,749,544 | 6/1988 | Crowther et al. | 376/443 |
| 5,164,150 | 11/1992 | Matzner | 376/210 |
| 5,167,911 | 12/1992 | Fujimura et al. | 376/440 |
| 5,267,286 | 11/1993 | Hirukawa | 376/353 |

*Primary Examiner*—Donald P. Walsh
*Assistant Examiner*—Meena Chelliah
*Attorney, Agent, or Firm*—Watson, Cole, Grindle & Watson

[57] ABSTRACT

A fuel assembly (16) for a boiling-water nuclear reactor arranged in groups with four fuel assemblies in each group and with a centrally placed control rod (17) forming a supercell. Each fuel assembly (16) includes a plurality of vertical fuel rods (12) with enriched nuclear fuel material (24), said rods being arranged between a bottom tie plate (13) and a top tie plate (14) in a surrounding vertical fuel channel (1) which is connected to a transition section (2). The transition section is provided with holes (20a–d) for by-pass flow outside the fuel assembly. The fuel assembly is characterized in that the by-pass holes are arranged in such a way that when turning the fuel assembly (16), including the transition section (2), 90°, 180° or 270° around the longitudinal axis of the fuel assembly, said holes are adapted to direct the by-pass flow away from the control rod (17).

11 Claims, 3 Drawing Sheets

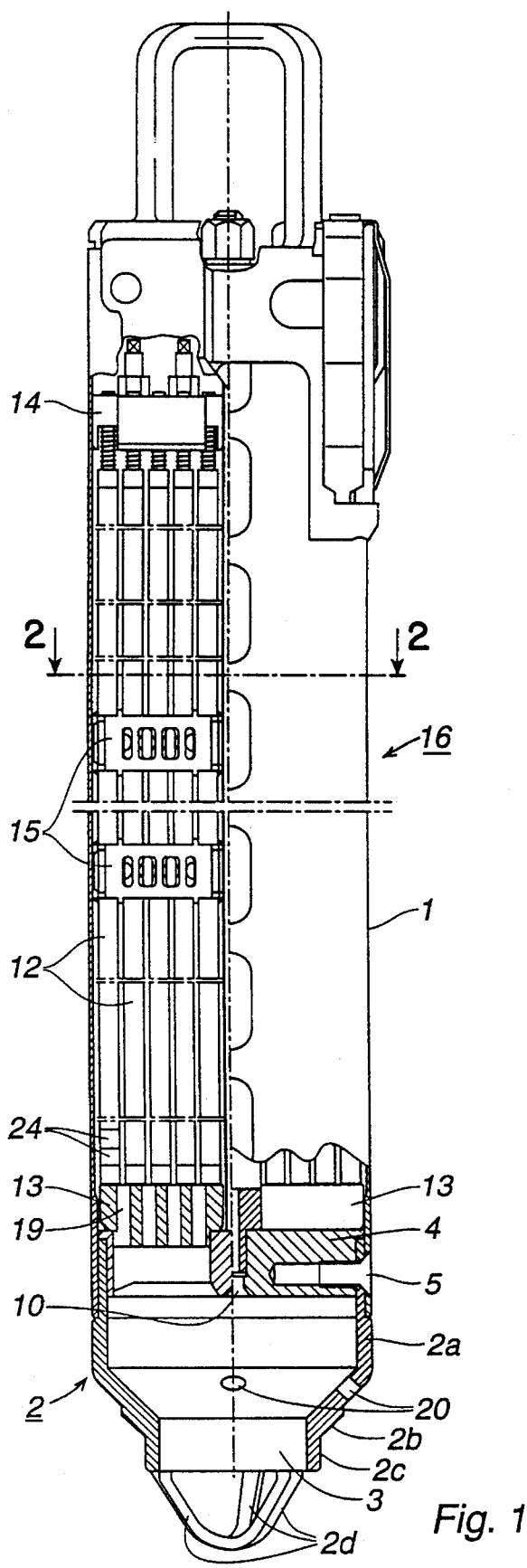
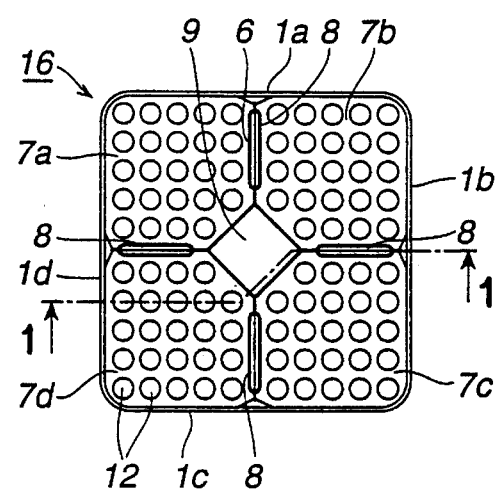
Fig. 1
Fig. 2

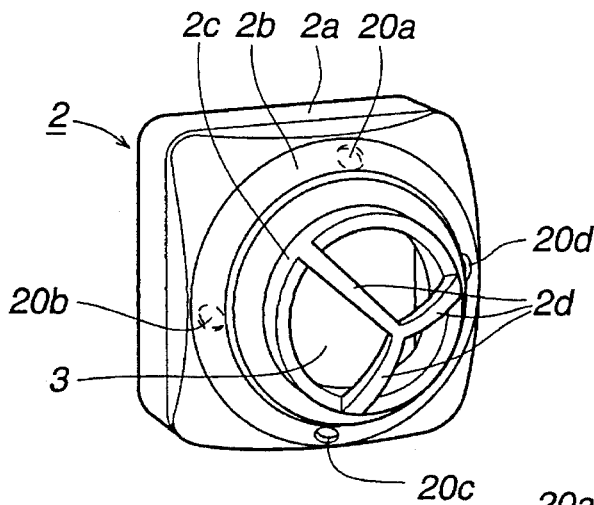
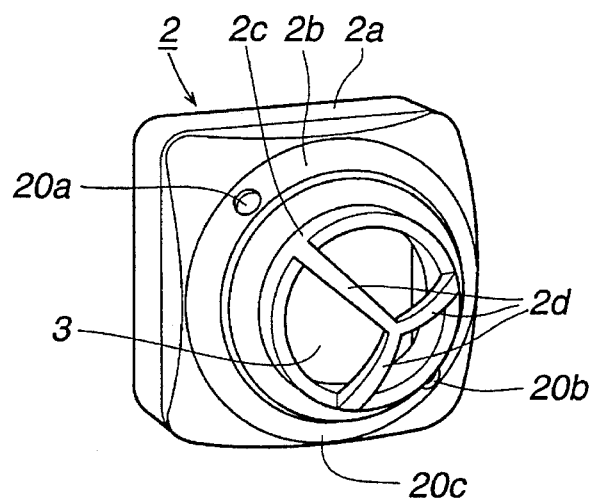
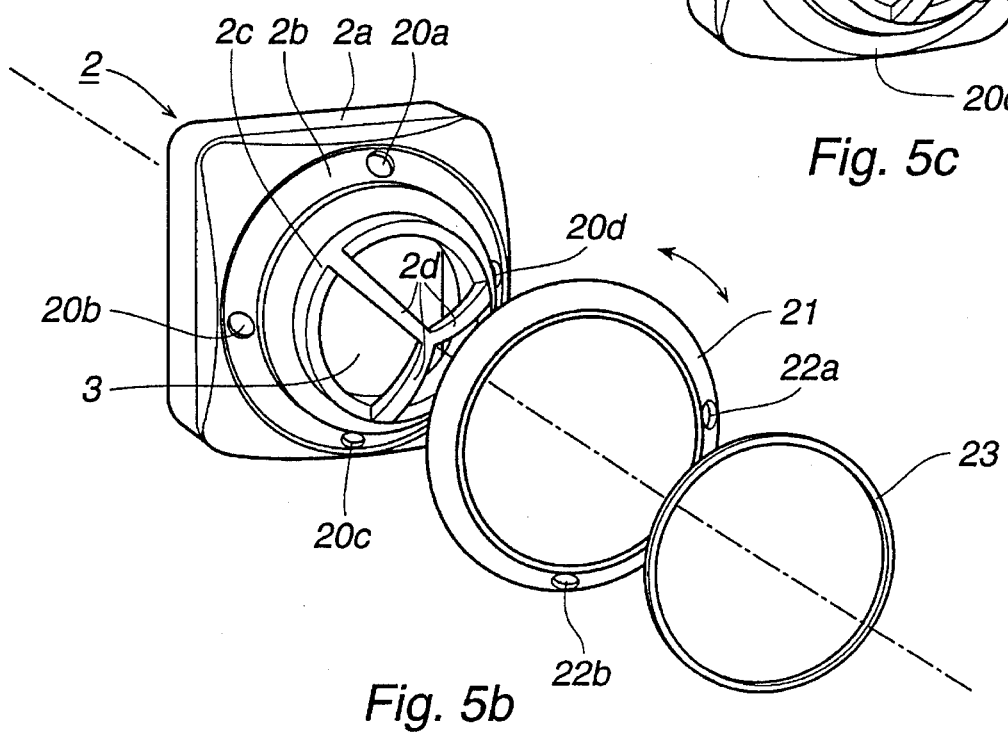

FUEL ASSEMBLY FOR A BOILING WATER REACTOR

TECHNICAL FIELD

The present invention relates to a fuel assembly for a boiling-water nuclear reactor. Such a fuel assembly comprises a plurality of vertical fuel rods and possibly occasional vertical, water-filled rods or inner, for example circular, rectangular or cruciform water channels, which fuel rods are surrounded by a fuel channel of substantially square cross section. Associated with the lower end of the fuel channel is a transition section with a downwardly-facing inlet opening for reactor coolant. The transition section is provided with through-holes for a so-called by-pass flow outside the fuel assembly. The fuel channel is open at both ends such that the reactor coolant can flow through the fuel assembly. Each rod is included in two rows perpendicular to each other and each rod contains a stack of circular-cylindrical pellets of a nuclear fuel, the stack being arranged in a cladding tube. The fuel rods are arranged between a bottom tie plate and a top tie plate which are both provided with through-holes for an inlet and an outlet and passage of coolant to the fuel rods. The fuel assemblies are arranged in groups of four, forming a so-called supercell. Centrally in the supercell, a control rod of cruciform cross section is arranged.

BACKGROUND ART, PROBLEMS

A reactor core with fuel assemblies as described above is immersed into water which serves both as coolant and as neutron moderator. The space between the fuel assemblies is filled with flowing water for neutron moderation. The distance between two fuel assemblies is referred to as gap width.

In addition to the water flowing along the fuel rods and the water being in contact with the fuel rods, the reactor core is traversed by a by-pass flow which is located at the above-mentioned gaps formed between the fuel assemblies. The major part of the water, typically 90%, is admitted into the fuel assemblies and allowed to boil therein. The remainder is discharged through the by-pass holes and is maintained in a nonboiling state. In certain cases, the fuel assemblies are provided with internal water channels. The water in these channels is not allowed to boil.

To obtain a specified quantity of by-pass flow outside the fuel assemblies, that is, in the gaps, the transition section of the fuel assemblies are provided with so-called by-pass holes which allow the passage of the required quantity of water outside the fuel assemblies.

Swedish printed patent application 424 236 discloses an example of a fuel assembly provided with continuous by-pass holes in the transition section. These holes are arranged at the center of the side surface of the fuel assembly and exactly opposite to each other, whereby the by-pass flow from one of the holes is always directed against the control rod.

U.S. Pat. No. 5,697,376 discloses another example of a fuel assembly provided with continuous by-pass holes in the transition section. These two holes are arranged at the center of the side surface of the fuel assembly with an approximately 90° angular adjustment. This location of the holes means that the fuel assembly can be arranged in one position only to prevent the by-pass flow from one of the holes from being directed against the control rod.

In certain cases there is a need to turn the fuel assembly through an angle of 90°, 180° or 270° around its longitudinal axis. One such case is when bending the fuel channel of the fuel assembly. Bending of the fuel channel may occur after some time of use and means that the fuel channel changes its shape by bending. Bending of the fuel channel may, in certain cases, constitute a problem in symmetrical core lattices. In symmetrical core lattices, the control rod gaps, that is, the gaps into which the control rods are inserted, and the narrow gaps, that is, the gaps into which the control rods are not inserted, have the same gap width. In symmetrical lattices, the fuel channel is bent in a random direction when being irradiated with fast neutrons. The fast neutrons entail release of residual stresses, whereby the structure of the material is changed such that the fuel channel is extended. When the different sides of the fuel channel are extended to different degrees, the fuel channel becomes deflected towards the direction where the largest extension has taken place.

In those cases where the fuel channel is bent in a direction towards the control rod in a supercell, the bending can be of such a magnitude that the control rod when being inserted into the core, for power control, adheres thereto. In those cases where this bending takes place in a direction towards the control rod, thus, the box should be turned 90°, 180° or 270° around its longitudinal axis to eliminate the risk of the bent fuel channel preventing the insertion of the control rod. When being bent, the fuel channel has a certain memory effect such that, if a fuel channel starts bending towards the control rod and the channel is turned such that it bends in a direction away from the control rod, the fuel channel will continue to bend in this direction, that is, away from the control rod. The memory effect is due to the fact that the gap towards which the fuel channel has started bending becomes smallest and is hence irradiated by more fast neutrons, whereby the bending continues towards this smallest gap.

During refuellings, the fuel assemblies are picked out of the core and its fuel channels are inspected with respect to bending. In those cases where bending in a direction towards the control rod has been determined, the fuel assembly is turned 90°, 180° or 270° around its longitudinal axis. The problem is then that the holes which, according to the prior art, are provided centrally on the two sides of the fuel assembly, facing away from the control rod, are arranged to direct the by-pass flow against the control rod. A by-pass flow directed against the control rod may cause the rod to vibrate and hence wear out holes in the fuel channel, which may lead to a reduction of the safety margin with respect to so-called dryout since less water is passed into the fuel assembly when the pressure is lower outside thereof.

SUMMARY OF THE INVENTION, ADVANTAGES

The invention relates to a fuel assembly with holes for a by-pass flow arranged so as to enable a turning of the fuel assembly 90°, 180° or 270° around its longitudinal axis without the by-pass flow being directed against the control rod.

The fuel assembly according to the invention comprises a cladding tube which is secured to a transition section. The transition section is formed with a guide member intended to guide the fuel assembly into an assembly supporting plate. The fuel assembly has a circular, downwardly-facing inlet opening which is surrounded by a substantially annular end surface of the transition section. The fuel assembly is intended to be arranged together with three identical fuel assemblies with a centrally placed control rod forming a supercell.

Somewhere between the assembly supporting plate and the lowest part of a nuclear fuel pellets column, one or more continuous by-pass holes are arranged, preferably in the conical wall portion of the transition section. The by-pass holes are adapted such that, independently of how the fuel assembly is arranged in the core, the by-pass flow is directed away from the control rod. Since the transition section is provided with four holes distributed with a substantially 90° pitch angle, the direction of the by-pass flow away from he control rod when turning the fuel assembly is achieved by the arrangement of a turning ring around the transition section, above the holes. The turning ring is provided with at east one hole arranged such that, irrespective of the location of the fuel assembly, the turning ring can be turned in a position such that at least one hole in the transition section is open for the passage of the by-pass flow directed away from the control rod.

In those cases where the assembly is to be turned through 180°, two continuous by-pass holes are suitably provided which are diametrically opposed and placed such that both the holes have an equally large distance to the control rod. Possibly, more holes can be arranged in the same position but separated in the vertical direction. With this embodiment, no turning ring is needed.

The size of the by-pass holes may vary depending on the desired quantity of water out from the fuel assembly.

The fuel assembly according to the invention is intended for arrangement in boiling water reactors where the predominant part of the water in the reactor core passes through the lower part of the fuel assembly, that is, through the transition section of the assembly.

The advantage of the invention is that in a simple manner a fuel assembly is obtained in which the holes for the by-pass flow are arranged such that they are not, neither before nor after a 90°, 180° or 270° turning, directed against the control rod in the above-mentioned supercell.

BRIEF DESCRIPTION OF THE DRAWINGS

The invention will be explained in greater detail by description of a number of embodiments with reference to the accompanying drawings.

FIG. 1 shows, in a vertical section through the line 1—1 in FIG. 2, an embodiment of a composed fuel assembly built up of four sub-assemblies for a boiling water reactor provided with a transition section.

FIG. 2 shows in a section 2—2 a fuel assembly according to FIG. 1.

FIGS. 5a–c show a perspective view of a transition section according to the invention.

DESCRIPTION OF THE PREFERRED EMBODIMENTS

Figure 3:
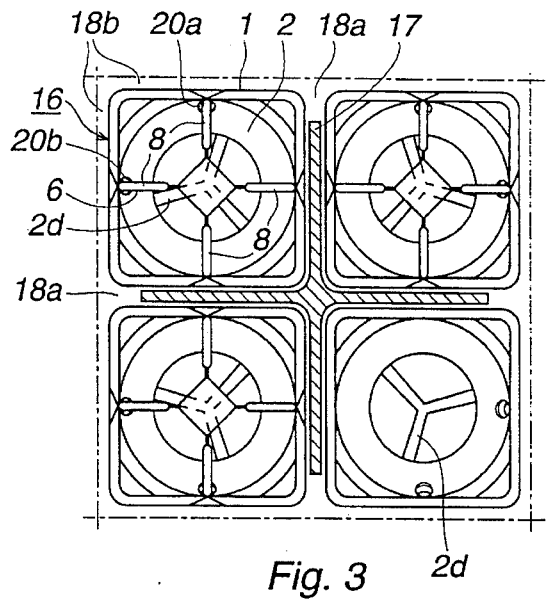
FIG. 3 schematically shows, in a view from above, a supercell with by-pass holes arranged according to prior art.

FIGS. 1–4 show a fuel channel 1 with a substantially square cross section. The fuel channel 1 surrounds with no significant play an upper square portion 2a of a transition section 2 which otherwise comprises a conical portion 2b and a cylindrical portion 2c (see also FIGS. 5a–c). The transition section 2 has a downwardly-facing inlet opening 3 for cooling water. The transition section 2 is formed with a guide member which is intended to guide the fuel assembly 16 into an assembly supporting plate (not shown) and comprises a plurality of guiding spokes 2d. Besides supporting the fuel channel 1, the transition section 2 also supports a bottom support 4. At its bottom the fuel channel 1 has a relatively thick wall portion which is fixed to the transition section 2 and the bottom support 4 by means of a plurality of horizontal bolts 5.

According to the embodiment shown, with a hollow support member 6 of cruciform cross section, the fuel channel 1 is divided into four vertical tubular parts 7a–d with at least substantially square cross section. The support member 6 is welded to the four walls 1a–d of the fuel channel 1 and has four hollow wings 8. The central channel formed by the support member 6 is designated 9 and at its bottom extended down through the bottom support 4 with an inlet 10 for moderator water. Each tubular part 7a–d comprises a bundle of twenty-four fuel rods 12. The rods 12 are arranged in a symmetrical lattice in rows in which each rod 12 is included in two rows perpendicular to each other.

Each bundle is arranged with a bottom tie plate 13, a top tie plate 14 and a plurality of spacers 15. A fuel rod bundle with a bottom tie plate 3, a top tie plate 14, spacers 15 and fuel channel part 1 forms a unit which is referred to as a sub-assembly, whereas the device illustrated in FIGS. 1–4 and comprising four such sub-assemblies is referred to as a fuel assembly 16. A unit comprising four fuel assemblies 16 and a control rod 17 arranged centrally therebetween constitutes a supercell. The spaces between the fuel rods 12 within each sub-assembly 7 are traversed by water, as is the hollow support member 6 of cruciform cross section in the fuel assembly 16. The gaps 18a–b between the fuel assemblies 16 are also traversed by water.

The four bottom tie plates 13 are supported in the fuel assembly 16 by the bottom support 4 and are each partially inserted into a respective square hole therein.

The holes for the passage of the water through the bottom tie plate 13 are designated 19.

FIG. 3 shows part of a symmetrical core lattice according to the prior art. The section comprises a supercell. In a symmetrical core lattice, the control rod gaps 18a, into which the control rods 17 can be inserted, have the same width as the narrow gaps 18b, into which no control rods 17 can be inserted. The control rods 17 have blades which form a rectilinear cross and are arranged centrally in the supercell. Two continuous holes 20a–b for by-pass flow are arranged in the wall portion of the transition section 2, facing away from the control rod 17. To illustrate the by-pass holes more clearly in the FIGS. 3 and 4a, one fuel assembly 16 in each figure is shown without the cruciform water channel 19.

Figure 4A:
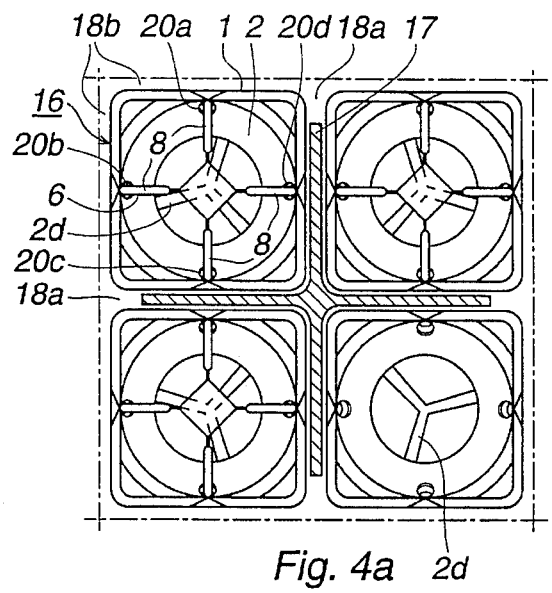
FIGS. 4a–c schematically shows, in a view from above, a supercell with by-pass holes arranged according to the invention.
Figure 4B:
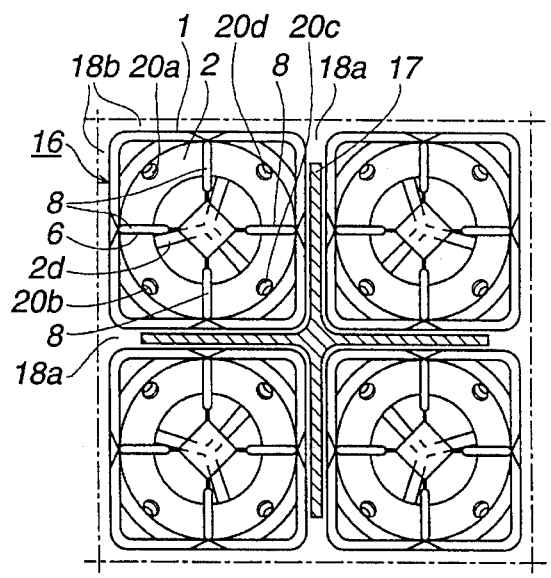
Figure 4C:
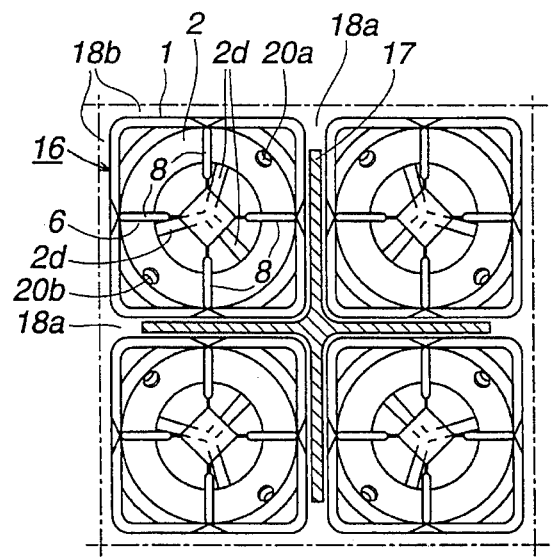

FIGS. 4a–c show part of a symmetrical core lattice, a supercell, according to the invention. FIG. 4a shows a supercell with fuel assemblies with by-pass holes 20a–d arranged in the transition section in a position corresponding to the center of the side surfaces of the fuel channel 1. FIGS. 5a–b show how the transition section is provided with a turnable valve, a turning ring 21, with holes 22a–b arranged such that a turning of the ring allows opening of two holes 21a–d at a time, which are located such that the by-pass flow is directed away from the control rod. The by-pass holes 20a–d may be arranged at any location between the assembly supporting plate and the lowest part of a fuel pellets column 24.

FIG. 4b shows a supercell with fuel assemblies where the by-pass holes 20a–d are arranged in a position corresponding to the corner of the fuel channel 1 where the transition section 2, in a manner corresponding to the embodiment of FIG. 4a, is provided with a turning ring 21 according to FIGS. 5a–b.

According to FIG. 4a, in the original operating position of the fuel assembly 16, the by-pass flow passes through the two holes 20a and 20b which are facing the narrow gaps 18b, whereas in the operating position when the fuel assembly 16 has been turned, for example, 180°, the by-pass flow passes through the holes 20c and 20d which in the original operating position were facing the control rod gaps 18a, but which after the turning are facing the narrow gaps 18b. This change of flow is made possible by causing the turning ring 21 to open/close two of the four holes 20a–d with which the transition section 2 is provided. Thus, by turning the turning ring 21, the two holes 20c and 20d, which in the original operating position are closed and facing the control rod gap 18a, open for the by-pass flow whereas the other two holes 20a and 20b are closed.

In FIG. 4b, in the original position of the fuel assembly 16, the by-pass flow passes through the holes 20b and 20d whereas the holes 20a and 20c are closed by means of the turning ring 21. When turning the upper lefthand fuel assembly 16, shown in the figure, for example 90° in the clockwise direction, the by-pass flow, after turning the turning ring 21, instead passes through the holes 20a and 20c when are then facing away from the control rod 17 in the supercell.

FIG. 4c shows an embodiment intended for fuel assemblies 16 which can only be turned 180° around their longitudinal axis. The embodiment shows two holes 20a–b for by-pass flow. The holes 20a–b are diametrically opposed and arranged symmetrically in the wall portion of the transition section 2 such that both holes 20a–b substantially have the same distance to the control rod 17. No turning ring 21 is needed since a 180° turn of the fuel assembly 16 results in the location of the holes 20a–b in relation to the control rod 17 being the same as before the turning. A transition section 2 according to FIG. 4c is also clear from FIG. 5c.

FIG. 5b shows the design of the turning ring 21 and its arrangement around the transition section 2. The front ring 23 shown in FIG. 5b is intended to fix the turning ring 21 in the desired position. In this case, the transition section 2 is provided with four holes 20a–d for the by-pass flow arranged around the conical wall portion 2b of the transition section 2 with an approximately 90° pitch angle. The turning ring 21 is provided with two holes 22a–b.

We claim:

1. A supercell of a boiling-water nuclear reactor which includes four fuel assemblies and a centrally located control rod, each fuel assembly including a plurality of vertical fuel rods containing enriched nuclear fuel material, said rods being arranged between a bottom tie plate and a top tie plate in a surrounding vertical fuel channel, said fuel channel being connected to a transition section, said transition section being provided with holes for a by-pass flow outside the fuel assembly, each fuel assembly being designed with a water inlet for passing water in through the bottom tie plate, through the space between the fuel rods in the vertical fuel channel and through the top tie plate, and each fuel assembly being arranged with intermediate gaps to adjacent fuel assemblies for passing water in the vertical direction through an inlet from the bottom and upwards through the core, and wherein each fuel assembly, including the transition section, is turnable through an angle of 90°, 180° or 270° around a longitudinal axis thereof, and each fuel assembly comprises a flow-preventing means arranged to prevent the passage of the by-pass flow through the hole or holes which, before or after a turning of the fuel assembly, are arranged so as to face the control rod in said supercell, whereby at least one hole faces away from the control rod, such that by-pass flow towards the control rod is prevented.

2. A supercell according to claim 1, wherein the holes for the by-pass flow of each fuel assembly are arranged at a lower part of the fuel assembly between an assembly supporting plate and a lowest part of the nuclear fuel material.

3. A supercell according to claim 1, wherein the flow-preventing member of each fuel assembly is a turnable turning ring located over the holes, said turning ring being turnable for opening at least one hole for the by-pass flow, which hole faces away from the control rod in said supercell.

4. A supercell according to claim 1, wherein the transition section of each fuel assembly is provided with four holes for the by-pass flow arranged with a substantially 90° pitch angle.

5. A supercell according to claim 4, wherein the by-pass holes are arranged in the transition section in a position corresponding to a corner of each fuel assembly.

6. A supercell according to claim 4, wherein the by-pass holes are arranged in the transition section in a position substantially corresponding to the center of side surfaces of each fuel assembly.

7. A supercell of a boiling-water nuclear reactor which includes four fuel assemblies and a centrally placed control rod, each fuel assembly including a plurality of vertical fuel rods containing enriched nuclear fuel material, said rods being arranged between a bottom tie plate and a top tie plate in a surrounding vertical fuel channel, said fuel channel being connected to a transition section, said transition section being provided with holes for a by-pass flow outside the fuel assembly, each fuel assembly being designed with a water inlet for passing water in through the bottom tie plate, through the space between the fuel rods in the vertical fuel channel and through the top tie plate, each fuel assembly being arranged with intermediate gaps to adjacent fuel assemblies for passage of water in the vertical direction through an inlet from below and upwards through the core, and wherein each fuel assembly, including the transition section, is turnable through an angle of 180° around its longitudinal axis, and each fuel assembly comprises at least one hole for the by-pass flow, which holes, before and after a turning, are arranged so as to face away from the control rod in said supercell, such that by-pass flow towards the control rod is prevented.

8. A supercell according to claim 7, wherein at a lower part of each fuel assembly at least two-holes for the by-pass flow are arranged diametrically opposite along a symmetry line so as to have substantially the same distance to the control rod in said supercell.

9. A supercell according to claim 7, wherein each fuel assembly includes a turnable turning ring arranged around a lower part of the fuel assembly over the by-pass holes, said turning ring being turnable for opening at least one hole for by-pass flow, said hole being directed away from the control rod in said supercell.

10. A supercell according to claim 1, wherein the by-pass holes are arranged in the transition section in a position corresponding to a corner of each fuel assembly.

11. A supercell according to claim 1, wherein the by-pass holes are arranged in the transition section in a position substantially corresponding to a center of side surfaces of each fuel assembly.

* * * * *